United States Patent [19]

Smith

[11] Patent Number: 4,472,930
[45] Date of Patent: Sep. 25, 1984

[54] LAWN COMB

[76] Inventor: Lyle E. Smith, R.F.D. #1, Calhoun, Mo. 65323

[21] Appl. No.: 359,597

[22] Filed: Mar. 18, 1982

[51] Int. Cl.$^3$ ............................................. A01D 77/00
[52] U.S. Cl. ........................................ 56/396; 56/400; 172/622
[58] Field of Search ............... 56/396, 397, 398, 400, 56/400–414; 172/619–622

[56] References Cited

U.S. PATENT DOCUMENTS

| 2,990,021 | 6/1961 | Johnson et al. | 56/400 |
| 3,765,159 | 10/1973 | Neff | 56/396 |
| 4,343,142 | 8/1982 | Allen | 56/397 |

FOREIGN PATENT DOCUMENTS 2055532  3/1981  United Kingdom ............... 172/622

Primary Examiner—Jay N. Eskovitz
Attorney, Agent, or Firm—Harvey B. Jacobson

[57] ABSTRACT

An elongated trailer-type vehicle is provided for pulling behind a prime mover such as a lawn tractor. The vehicle includes an elongated frame having vertically adjustable hitch structure at its forward end for releasable hitching behind a lawn tractor and downwardly extendible and upwardly retractable ground engaging support wheels for decreasing and increasing, respectively, the elevation of the frame above the ground surface upon which the wheels rest. The frame additionally includes front and rear depending spring tine assemblies forward and rearward of the wheels and the tine assemblies each include a plurality of depending tines spaced transversely of the frame. By raising and lowering the wheels relative to the frame, the spring tines may be adjusted relative to the lawn surface over which the wheels of the trailer move and adjustment of the hitch structure relative to the front of the frame in connection with vertical adjustment of the frame wheels may incline the frame either forwardly and downwardly or forwardly and upwardly relative to the horizontal. Inasmuch as the tine assemblies are dependedly supported from the frame forward and rearward of the wheels, either the front tine assembly, the rear tine assembly or both tine assemblies may be engaged with the ground with equal or unequal forces.

3 Claims, 3 Drawing Figures

LAWN COMB

BACKGROUND OF THE INVENTION

In order to promote maximum lawn growth and thickness, it is desirable to remove the thatch layer of a lawn and various forms of thatch removal devices heretofore have been provided. Some of the most effective thatch removal devices include horizontal rotatably mounted drums or similar structures including generally radial tines, but these types of thatch removal devices must be advanced very slowly over a lawn. Accordingly, a need exists for an improved form of lawn thatch removal device whereby at least major portions of the thatch layer of a lawn may be removed in a minimum of time.

Examples of previously known forms of thatch removal device as well as similar structures including at least some of the general structural and operational features of the instant invention are disclosed in U.S. Pat. Nos. 2,535,441, 2,739,396, 2,990,021, 3,237,324 and 3,765,159.

BRIEF DESCRIPTION OF THE INVENTION

An elongated trailer frame is provided with vertically adjustable hitch structure at its forward end and crank mounted ground engageable support wheels intermediate its opposite ends. The trailer frame further includes front and rear depending spring tine assemblies disposed forward and rearward, respectively, of the wheels. The tine assemblies are supported from the forward and rear transverse members of a rectangular subframe supported atop the main frame of the trailer and vertical adjustment of the crank supported wheels as well as vertical adjustment of the hitch structure enables the spring tines to variably engage the surface over which the wheels roll. Inasmuch as the hitch structure as well as the wheels are vertically adjustable relative to the main frame, the forward and rear tines may be adjusted in elevation so as to engage the ground with the same force, or the main frame of the trailer may be forwardly downwardly inclined to more heavily engage the ground with the forward tines and forwardly and upwardly inclined to more heavily engage the ground with the rear tines. Further, increases in inclination of the main frame of the trailer may allow only the forward tines or only the rear tines to engage the ground.

The main object of this invention is to provide a trailer-type implement which may be utilized to remove thatch from lawns.

Another object of this invention is to provide a thatch remover constructed in a manner whereby the thatch removing operation formed thereby on a lawn may be varied as desired.

Still another important object of this invention is to provide a thatch removing apparatus which may be readily trailed behind any suitable prime mover such as a lawn tractor.

A further object of this invention is to provide a thatch remover which will be capable of performing a substantially complete thatch removing operation in a minimum amount of time.

A final object of this invention to be specifically enumerated herein is to provide a thatch removing apparatus for lawns and which will conform to conventional forms of manufacturer be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
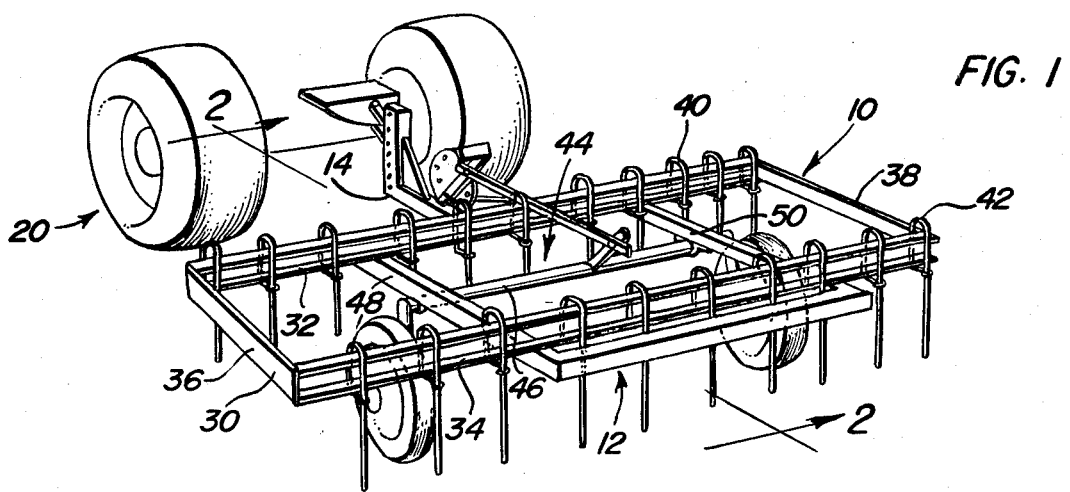
FIG. 1 is a perspective view of the lawn comb of the instant invention illustrated operatively attached to the rear of a lawn tractor which is only fragmentarily illustrated.
Figure 3:
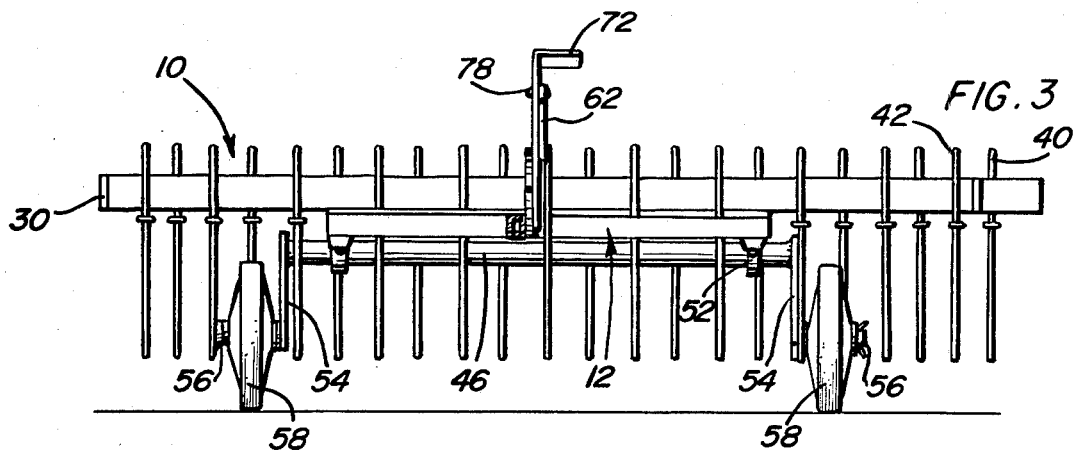
FIG. 3 is a transverse vertical sectional view taken substantially upon the plane indicated by the section line 3—3 of FIG. 2.

Referring now more specifically to the drawings, the numeral 10 generally designates the lawn comb of the instant invention. The lawn comb 10 includes a main trailer frame referred to in general by the reference numeral 12 having a forwardly projecting tongue portion 14 from which a vertically adjustable hitch structure 16 is supported. The hitch structure 16 is removably coupled to a tow hitch 18 of a lawn tractor or similar prime mover referred to in general by the reference numeral 20. A hitch pin 22 is utilized to removably couple the hitch structure 16 to the tow hitch 18 and the hitch structure 16 is adjustably supported from a vertically extending forward component 24 carried by the forward end of the tongue 14. The vertical component 24 comprises a tubular member including vertically spaced transverse bores 26 formed therethrough and an anchor pin 28 is removably passed through a selected set of bores 26 and the hitch structure 16.

The main frame 12 supports a rectangular subframe 30 therefrom including front and rear transverse members 32 and 34 interconnected at corresponding ends by opposite side longitudinally extending members 36 and 38. Front and rear sets of depending spring tines 40 and 42 are supported from the transverse members 32 and 34 and are spaced therealong transversely of the subframe 30. The tines 40 and 42 are substantially identical and terminate downwardly in a horizontal plane when the frame 12 is horizontally disposed.

A crank axle assembly referred to in general by reference numeral 44 and including a main shaft portion 46 is journalled from the opposite side longitudinal members 48 and 50 of the main frame 12 by journal blocks 52 which rotatably journal the opposite ends of the main shaft portions 46. The ends of the main shaft portions 46 disposed outwardly of the journal blocks 52 include parallel crank arms 54 and the free ends of the crank arms 54 include horizontal spindles 56 upon which ground engageable support wheels 58 are journalled. The longitudinal mid portion of the main shaft portion 46 includes a radially extending crank arm 60 and a control lever 62 is pivotally supported at one end from a sector plate 64 mounted on the forward end of the main frame 12. A pivot fastener 66 is utilized to pivotally support the crank lever 62 from the sector plate 64 and the latter includes a plurality of transverse bores 68 formed therethrough along an arcuate path having the fasteners 66 as its center of curvature. The control lever 62 includes a laterally projecting pin 70 which is selectively receivable in bores 68 and the free end of the control lever 62 includes a laterally directed handle portion 72. The free end of the control lever 62 and the free end of the crank arm 60 are interconnected by an elongated link 74 whose opposite ends are pivotally connected to the free ends of the crank arm 60 and control lever 62. A pivot fastener 76 is utilized to secure the link 74 to the crank arm 60 and a pivot fastener 78 is utilized to secure the lever 74 to the control lever 62, the fastener 78 being receivable through selected bores 80 formed in and spaced longitudinally of the control lever 62.

Figure 2:
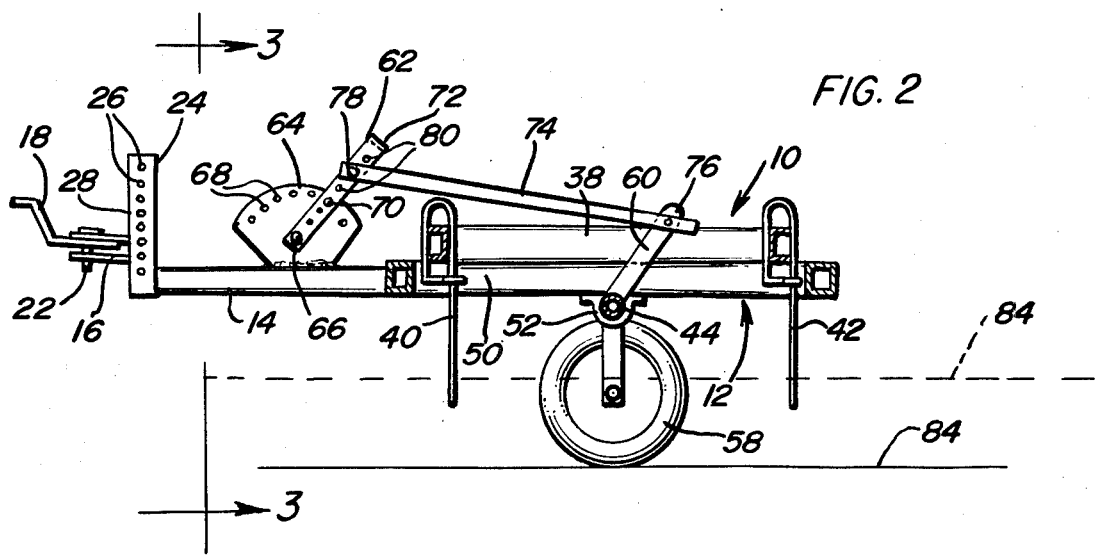
FIG. 2 is a side elevational view of the lawn comb.

From FIG. 2 of the drawings, it may be seen that the crank arm 60 may be oscillated between the solid and phantom line positions thereof in order to lower and raise the wheels 58. It is to be noted that the control lever 62 may be slightly laterally deflected in order to withdraw the pin 70 from one of the bores 68 after which the control lever 62 may be pivoted relative to the sector plate 64 until the pin 70 is registered with another bore 68. At this time, the lateral pressure applied to the control lever 62 may be released in order to engage the pin 70 in the bore 68 with which it is registered.

When the wheels 58 are in their lowermost positions illustrated in solid lines in FIG. 2 of the drawings, the lower ends of the tines 40 and 42 are spaced above the ground 84 engaged by the wheels 58. However, the wheels 58 may be retracted upwardly toward the phantom line positions thereof illustrated in FIG. 2 of the drawings in order to lower the tines 40 and 42 into engagement with the ground 84. By regulating the adjustment of the wheels 58 and also vertically adjusting the hitch structure 16 relative to the vertical member 24, the subframe 30 may be maintained horizontal. In this manner, the tines 40 and 42 will engage the ground 84 with the same force. However, if the hitch structure 16 is adjusted to the lower portion of the upstanding portion 24, the frame 12 will be rearwardly and downwardly inclined and only the rear tines 42 may engage the ground 84 or the rear tines 42 may engage the ground 84 with greater force than the forward tines 40. On the other hand, if the hitch structure 16 is adjusted upwardly on the vertical portion 24, the frame 12 may be forwardly and downwardly inclined whereby the forward tines 40 will engage the ground with greater force than the rear tines 42, or only the forward tines 40 will be engaged with the ground 84.

In this manner, the thatching operation to be performed on a lawn over which the lawn comb 10 is moved may be modified as desired for that particular lawn. In addition, the lower ends of the tines 40 and 42 may be either vertically disposed, forwardly and downwardly inclined or rearwardly and downwardly inclined. Further, it is to be noted that when the trailer frame 12 is forwardly and downwardly inclined, the lower ends of the tines 40 and 42 will be slightly and rearwardly inclined. On the other hand, when the trailer frame 12 is forwardly and upwardly inclined, the lower ends of the tines 40 and 42 will be slightly forwardly inclined. Thus, it may be seen that the thatching operation to be performed on a lawn by the lawn comb 10 may be even further adjusted according to the existing lawn conditions.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A trailer-type lawn comb for pulling behind a prime mover, said comb including an elongated frame provided with hitch means at one end for releasable hitching behind a prime mover, said frame including downwardly extendible and upwardly retractable ground engageable support wheel means for increasing and decreasing, respectively, the elevation of said frame above a ground surface upon which said wheel means rests, said frame including front and rear depending spring tine assemblies supported therefrom forward and rearward of said wheel means, said tine assemblies each including a plurality of depending tines spaces transversely of said frame, said hitch means being supported from said frame for adjustable vertical positioning relative thereto independent of downward extension and upward retraction of said support wheel means, said frame including a longitudinally extending main frame from which said hitch means and support wheel means are supported and a generally rectangular subframe supported from and overlying said main frame, said subframe including opposite side longitudinal members extending between and connected to corresponding opposite ends of front and rear transverse members of said subframe, said front and rear transverse members being disposed forward and rearward of said support wheel means, said front and rear depending tine assemblies are supported from said front and rear transverse members, said support wheel means comprising wheels journalled from the free ends of opposite end crank arms carried by a single crank axle including a main shaft portion oscillatably supported from said frame for angular displacement about a horizontal transverse axis spaced generally centrally intermediate said front and rear transverse members.

2. The combination of claim 1 wherein a central portion of the crank axle includes a generally radially extending central crank arm, a control lever pivotally supported from a forward portion of said frame and generally paralleling said crank arm, and a connecting link pivotally connected between the free ends of said crank arm and said control lever.

3. The lawn comb of claim 2 wherein said control lever and main frame include coacting structure operable to releasably secure said control lever in adjusted angularly displace position relative to said main frame.

* * * * *